Nov. 6, 1923.
W. HOSKINS
1,473,347
ART OF PRODUCING CHEMICAL REACTIONS
Filed July 21, 1921
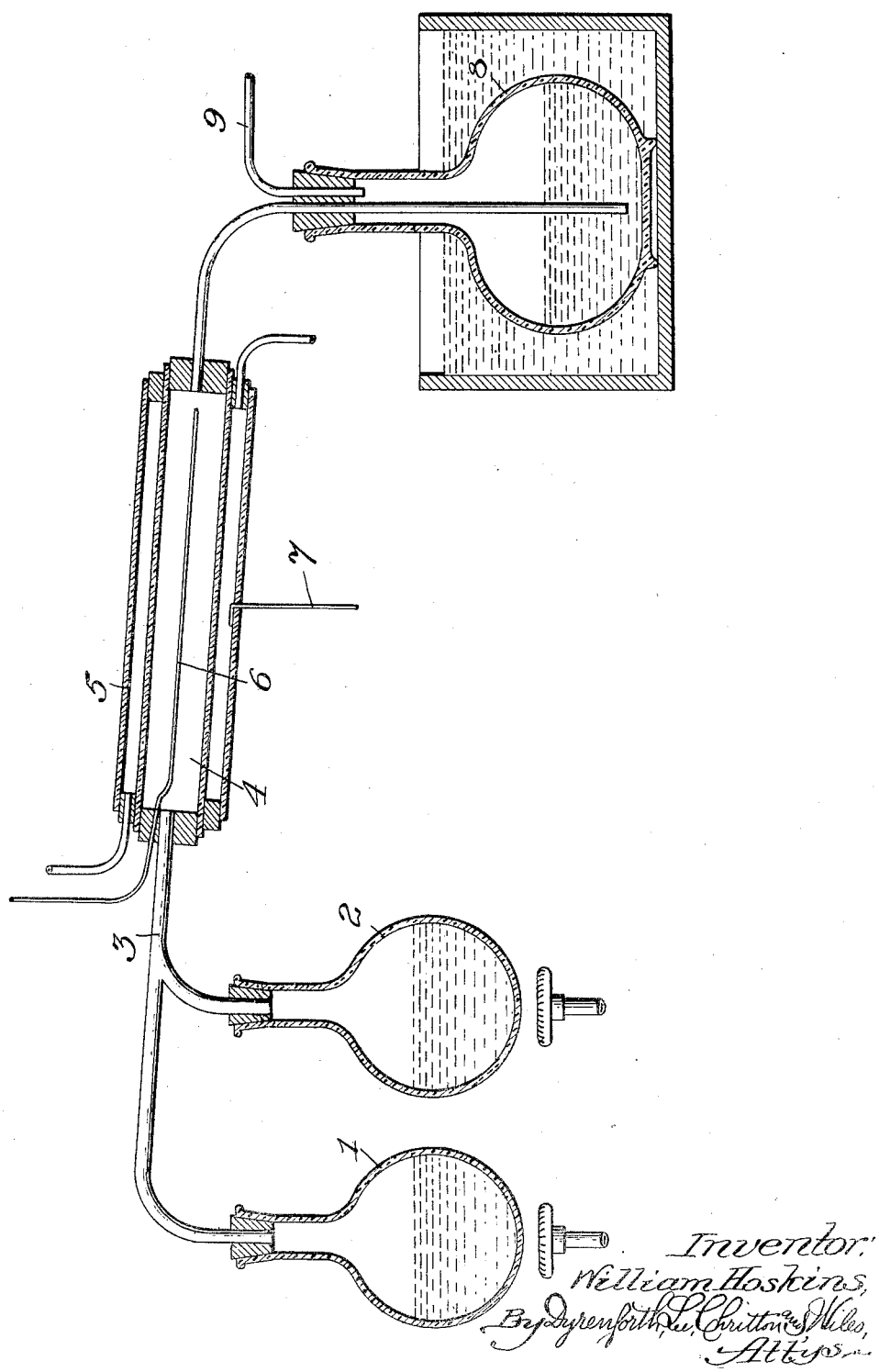

Patented Nov. 6, 1923.

1,473,347

UNITED STATES PATENT OFFICE.

WILLIAM HOSKINS, OF CHICAGO, ILLINOIS.

ART OF PRODUCING CHEMICAL REACTIONS.

Application filed July 21, 1921. Serial No. 486,347.

*To all whom it may concern:*

Be it known that I, WILLIAM HOSKINS, a citizen of the United States, residing at Chicago, in the county of Cook and State of Illinois, have invented a new and useful Improvement in the Art of Producing Chemical Reactions, of which the following is a specification.

This invention is a new method of producing phenol-formaldehyde condensation products or resins, and will be clearly understood from the following description illustrated by the accompanying drawing, in which an apparatus in which the method may be carried out is diagrammatically shown.

In producing a condensation resin from phenol and formaldehyde, I continuously treat the reacting substances in the gaseous phase. Appropriate means is employed for throwing the materials into the gaseous phase. The formaldehyde and phenol may, for instance, be appropriately vaporized in stills 1 and 2, the vapors passing continuously through and mixing in a common pipe 3 and thence continuously through a tubular treating conduit 4, which in the case of these particular reagents is surrounded by a hot-water or steam jacket 5 to maintain a temperature such that condensation will not occur therein. Within the treating conduit 4 is an electrode 6, and another electrode 7 enters the water jacket. These two electrodes form terminals of a source of high potential electricity, say of the order of 20,000 volts, so the mixed reagents in passing through the treating conduit are subjected to a silent discharge.

The vapors treated may be cooled and condensed in a condenser 8. It is often desirable to maintain the whole system under a partial vacuum as by the use of a pump or aspirator attached to an outlet pipe 9. The use of reduced pressures generally tends to make the use of lower voltages effective and continuous and enables a lower temperature to be employed.

By this process it is possible to cause the rapid combination of pure formaldehyde and pure phenol without a catalyst or any foreign body. Upon heating the distillate collected in the condenser 8 about 60 per cent will pass off, of which a part is apparently phenol and a part has not been identified, but appears to consist, at least in part, of hitherto unknown polymers of formaldehyde. The remaining 40 per cent of the distillate in the condenser 8, however, is a condensation resin generally similar to those resins produced from the same raw materials by other processes.

It is clear brown, hard and brittle, slightly soluble in alcohol and is soluble in alcohol and ether if not subjected to temperatures as high as 280° C. for an appreciable length of time. On continued heating it becomes insoluble in water, alcohol, ether, linseed oil, turpentine, mixtures of alcohol and ether, and turpentine and linseed oil.

What I regard as new, and desire to secure by Letters Patent, is—

1. The step in the manufacture of condensation resin consisting in treating a stream of phenolic and methylene bodies in the gaseous phase with a silent discharge and collecting the treated products.

2. The herein described improvement in the manufacture of condensation resin which consists in subjecting a stream of the mixed vapors of phenol and formaldehyde to the action of a silent discharge and thereby causing a reaction, collecting the products and separating out the condensation resin.

3. The method of producing resin-like condensation products of phenolic bodies and formaldehyde which consists in subjecting the mixture of the vapors of said reacting bodies to the action of a silent discharge, thereby causing reaction, and removing the products.

WILLIAM HOSKINS.